United States Patent [19]
Kopelman et al.

[11] Patent Number: 5,627,922
[45] Date of Patent: May 6, 1997

[54] MICRO OPTICAL FIBER LIGHT SOURCE AND SENSOR AND METHOD OF FABRICATION THEREOF

[75] Inventors: Raoul Kopelman, Ann Arbor, Mich.; Weihong Tan, Ames, Iowa; Zhong-You Shi, Ann Arbor, Mich.

[73] Assignee: Regents of the University of Michigan, Ann Arbor, Mich.

[21] Appl. No.: 397,331

[22] Filed: Mar. 2, 1995

Related U.S. Application Data

[63] Continuation of PCT/US93/08250, Sep. 3, 1993, which is a continuation-in-part of Ser. No. 941,879, Sep. 4, 1992, Pat. No. 5,361,314.

[51] Int. Cl.⁶ .............. G02B 6/00; G02B 21/00; G01J 1/04
[52] U.S. Cl. .............. 385/12; 385/38; 385/43; 385/33; 385/123; 385/127; 385/128; 359/368; 359/385; 250/227.14
[58] Field of Search .............. 385/12, 125, 33, 385/43, 14, 31, 123, 38, 127, 128; 359/368, 385; 250/227.14, 227.18, 227.11; 427/162, 163, 457, 487

[56] References Cited

U.S. PATENT DOCUMENTS

| | | | |
|---|---|---|---|
| 3,932,184 | 1/1976 | Cohen et al. | 385/33 X |
| 4,067,937 | 1/1978 | Unno et al. | 385/33 X |
| 4,137,060 | 1/1979 | Timmermann | 385/33 X |
| 4,380,365 | 4/1983 | Gross | 385/33 X |
| 4,671,609 | 6/1987 | Khoe et al. | 385/33 X |
| 4,795,228 | 1/1989 | Schneider | 385/33 X |
| 4,929,049 | 5/1990 | Le Goullon et al. | 385/12 X |
| 5,011,254 | 4/1991 | Edwards et al. | 385/33 X |
| 5,037,174 | 8/1991 | Thompson | 385/33 X |
| 5,062,686 | 11/1991 | Barrow et al. | 385/33 |
| 5,096,671 | 3/1992 | Kane et al. | 385/12 X |
| 5,105,305 | 4/1992 | Betzig et al. | 385/12 |
| 5,127,080 | 6/1992 | Duggan, Sr. | 385/120 |
| 5,361,314 | 11/1994 | Kopelman et al. | 385/12 |

*Primary Examiner*—Brian Healy
*Attorney, Agent, or Firm*—Harness, Dickey & Pierce, P.L.C.

[57] ABSTRACT

This invention relates generally to the development of and a method of fabricating a fiber optic micro-light source and sensor (50). An optical fiber micro-light source (50) is presented whose aperture is extremely small yet able to act as an intense light source. Light sources of this type have wide ranging applications, including use as micro-sensors (22) in NSOM. Micro-sensor light sources have excellent detection limits as well as photo stability, reversibility, and millisecond response times. Furthermore, a method for manufacturing a micro optical fiber light source is provided. It involves the photo-chemical attachment of an optically active material onto the end surface of an optical fiber cable which has been pulled to form an end with an extremely narrow aperture. More specifically, photopolymerization has been applied as a means to photo-chemically attach an optically active material (60). This process allows significant control of the size of the micro light source (50). Furthermore, photo-chemically attaching an optically active material (60) enables the implementation of the micro-light source in a variety of sensor applications.

23 Claims, 4 Drawing Sheets

_Fig - 8_

_Fig - 9_

MICRO OPTICAL FIBER LIGHT SOURCE AND SENSOR AND METHOD OF FABRICATION THEREOF

This invention was made with government support under Grant Nos.: DE-FG02-90-ER60984 and DE-FG02-90-ER61085 awarded by the Department of Energy. The government has certain rights in the invention.

This is a continuation of International Application PCT/US93/08250, having an International filing date of Sep. 3, 1993, which is a continuation-in-part of U.S. Ser. No. 07/941,879, filed Sep. 4, 1992, now U.S. Pat. No. 5,361,314, issued Nov. 1, 1994.

BACKGROUND OF THE INVENTION

This invention relates generally to the field of near-field scanning optical microscopy (NSOM), and more particularly to the development, a method of fabricating, and applications of a micro optical fiber light source which may be used as a light source or a sensor.

Microscopes that employ conventional optical imaging techniques are generally limited in their ability to resolve features that are substantially smaller than approximately ½ the wave length of light. Consequently, NSOM techniques have been employed to achieve resolution better than ½ the wave length of light. In general, NSOM requires that the aperture diameter be less than the wavelength of light and also that the aperture be positioned in extremely close proximity to the specimen to be examined. NSOM generally relates to the interaction of light impinged upon a sample with the sample to be examined. The strength of the collected light is generally a function of the probe position relative to the sample.

There are several known methods to designing probes to be used in NSOM. One such method is the use of tapered glass pipettes where an optical aperture is defined at the narrow end of the pipette by metalizing the annular region at the very end of the pipette. A second method is using a single mode optical fiber having a flat end and a highly tapered terminal portion whose outer walls are coated with metal, leaving a bare portion to function as an aperture at the very end of the fiber. The above two design approaches for NSOM probes involve certain inherent limitations. One such limitation is the decrease in signal strength because of the aperture size. A second limitation is that the thickness of the metal layers generally applied to the tapered portion of the probes contribute to the size of the probe tip, thereby enlarging the probe tip.

Several of these disadvantages were addressed in later developments which included the incorporation of fluorescent means into the probe tip. The fluorescent means enabled designers to develop an even smaller aperture than those existing in the above mentioned probes. With respect to optical fibers, there is a limitation on the implantation of the fluorescent means onto the probe tip of an optical fiber. While it is possible to implant fluorescent means onto a tapered optical fiber tip, the implantation methods are limited to one of two means. The first such means is ion implantation of an appropriate metal such as cerium, terbium, and europium. Alternatively, fluorescent means may be implanted onto the optical fiber through use of a borehole in the tip of the optical fiber after which fluorescent means, such as dyes, may be implanted into the bore hole. Neither of these two methods, however, result in a chemical attachment of the fluorescent means to the optical fiber tip.

This invention is directed to an improved micro light source (note that micro as used herein refers to light sources on the order of less than 100 microns) and method of fabrication thereof wherein a process is employed to photo-chemically attach an optically active material to the tip of a significantly tapered optical fiber. This results in an optical fiber light source whose aperture is extremely small yet able to act as an intense light source. Light sources of this type have wide ranging applications across a variety of chemical, biological, and medical fields including use as micro-sensors in NSOM. As a micro-sensor, the light source has excellent detection limits as well as photo stability, reversibility, and millisecond response times. Furthermore, successful applications of light sources as sensors include intracell and intra-embryo measurements. Such micro-sensors also have potential applications which include spatially and temporally resolved chemical analysis and kinetics inside single biological cells and their substructures.

A further aspect of this invention involves a method for manufacturing an optical fiber micro optical fiber light source. This method involves the photo-chemical attachment of an optically active material onto the end surface of an optical fiber cable which has been pulled to form an end with a dimension on the order less than 100 microns. More specifically, photopolymerization has been applied as a means to photo-chemically attach the optically active material. This process allows significant control of the size of the micro light source as the degree of photopolymerization varies in accordance with the reaction time of the polymerization process and the shape of the material photopolymerized onto the optical fiber tip varies in accordance with the intensity of the light coupled to the optical fiber and emitted in the direction of the tip. Furthermore, photo-chemically attaching an optically active material enables the implementation of the micro-light source in a variety of sensor applications. In yet a further aspect of this invention, the photo-chemical attachment process may be performed in multiple stages.

Further objects, features and advantages of the invention will become apparent from a consideration of the following description and the appended claims when taken in connection with the accompanying drawings.

DETAILED DESCRIPTION OF THE INVENTION

I. MICRO-LIGHT SOURCE/SENSOR AND AN APPLICATION THEREOF

Figure 1:
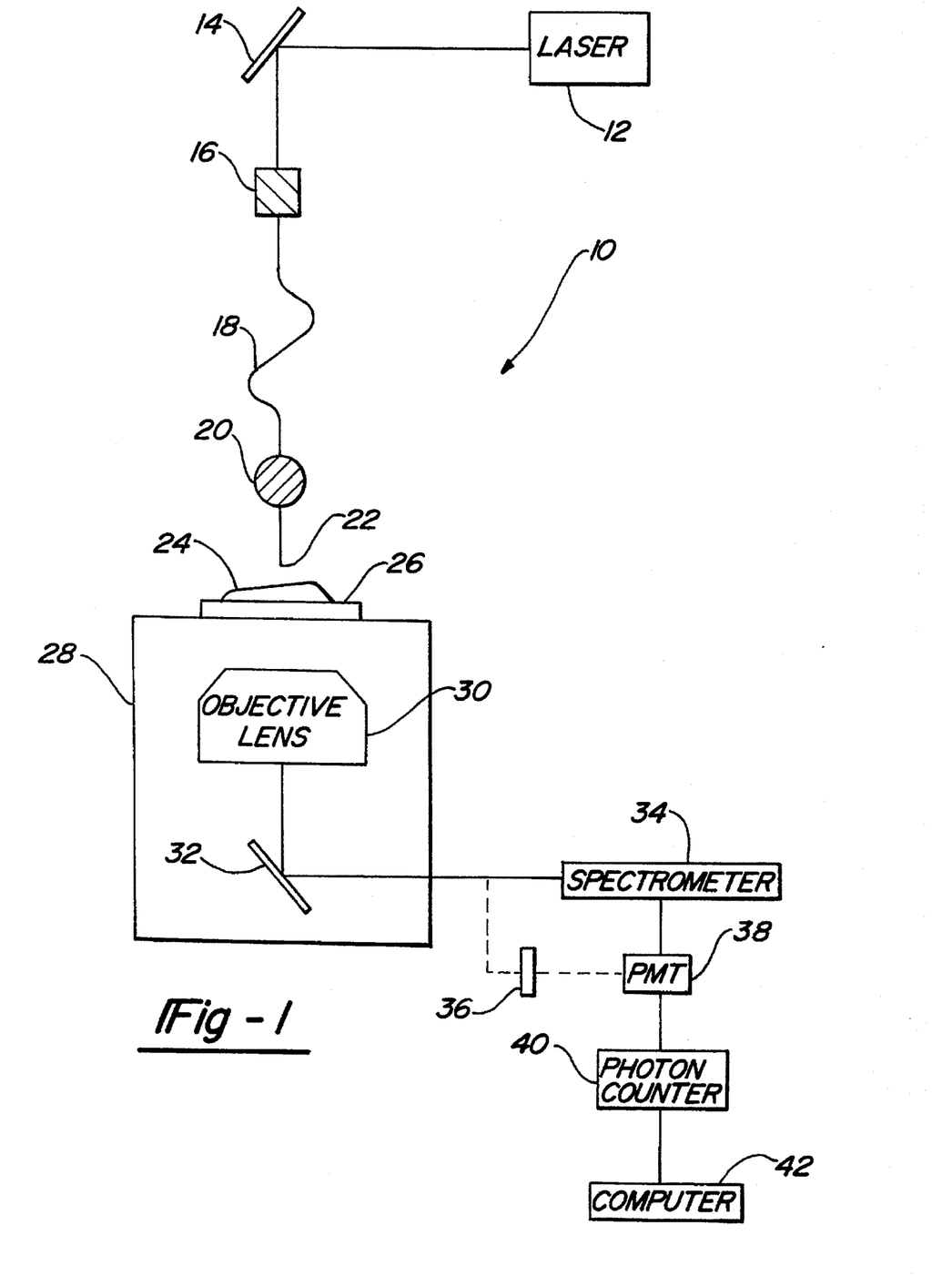
FIG. 1 is a block diagram of the system used to implement the micro light source as an optical fiber micro-sensor.

FIG. 1 depicts a block diagram of the system 10 which implements the optical fiber micro-light source. Here the micro-light source is employed in an NSOM application and functions as a sensor. A laser 12 generates an ion laser beam which is reflected off mirror 14 and directed into coupler 16. Coupler 16 focuses the laser beam produced by laser 12 so that it may be directed into optical fiber 18, as the laser beam generally produced by laser 12 is of a diameter larger than optical fiber 18 and consequently can not be focused directly into it. Optical fiber 18 further directs the laser beam towards the optical micro-sensor 22, which herein is implemented using a micro-light source to be described further herein with respect to FIGS. 2, 3, and 4. Micro-sensor 22 is positioned with respect to sample 24 using a three way translational stage 20 capable of positioning micro-sensor 22 in any one of three orthoganal directions. Sample 24 rests on glass slide 26 which is further attached to inverted microscope 28. In this particular application, the inverted microscope 28 is an inverted frame fluorescence microscope comprising an objective lens 30 to collect light and focus that light onto mirror 32 represented herein by a dichroic mirror. The light is further directed to a spectrometer 34 where the light emissions collected by objective lens 30 are separated into individual component wavelengths.

Alternatively, light collected by objective lens 30 and reflected by dichroic mirror 32 may be passed through a band pass filter 36 and then into photo multiplier tube 38. Photo multiplier tube 38 translates light frequencies into electrical pulses to be further measured by photon counter 40 and recorded by computer 42. Photon counter 40 measures the intensity of the light collected by objective lens 30 by evaluating the electrical signal output by photo multiplier tube 38. The entire system 10 may optionally be mounted on an air table in order to ensure vibration isolation.

Figure 2:
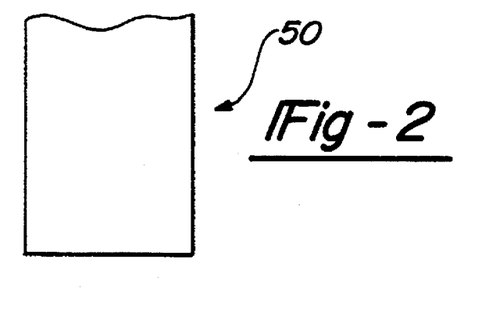
FIG. 2 is a drawing of a typical optical fiber.
Figure 3:
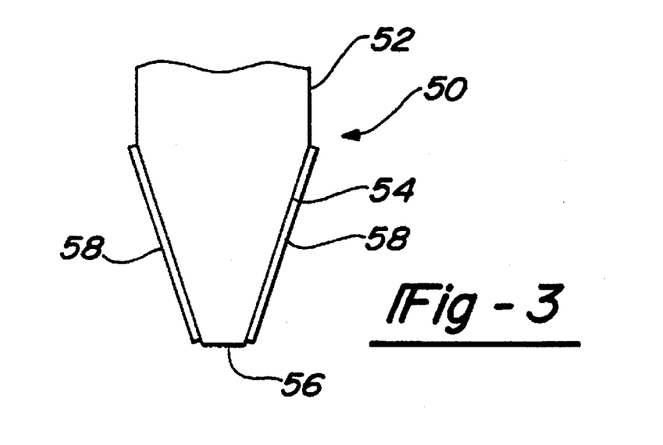
FIG. 3 is a drawing of a optical fiber which has been pulled to taper down to a micro optical fiber tip.
Figure 4:
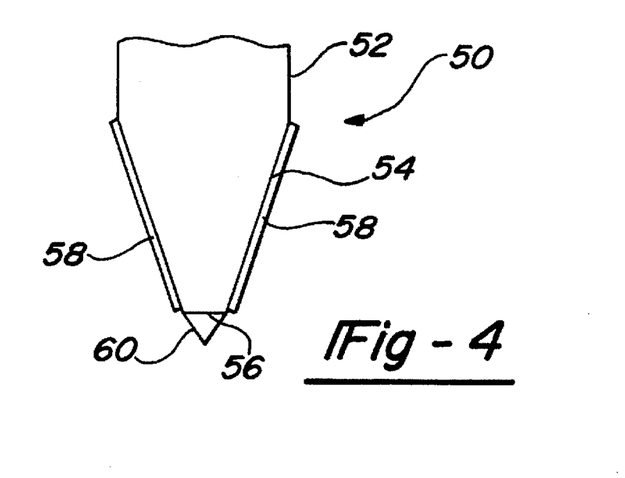
FIG. 4 is a drawing of a pulled tip optical fiber light source which has been polymerized at the end surface with an optically active material.

The primary focus of this invention is the fabrication and use of optical fiber micro-light sources. With respect to FIG. 1 the use of a micro-light source as optical fiber micro-sensor 22 enables the implementation of near-field scanning optical microscopy (NSOM). The fabrication and use of the micro-light sources to be described herein have applications in a variety of scientific fields including use as micro-sensors with improved limits, improved response time, and improved spatial resolution. Referring specifically to FIGS. 2, 3, and 4, the fabrication of the optical fiber micro-light sensor will be described herein.

FIG. 2 shows a typical optical fiber 50 used as a starting point for fabricating the optical fiber micro-light source. The optical fiber is removed from its jacket and heated using an infrared laser. Simultaneously, the optical fiber is mounted in a micropipette puller and is subsequently stretched while being heated. This forms an optical fiber as embodied in FIG. 3. The pulled optical fiber includes a body 52 of substantially the same diameter as an unpulled optical fiber, a tape red portion 54 and a substantially flat end face defined as an optical fiber tip 56. The tapered portion 54 of optical fiber 50 is then coated with an opaque material 58 which inhibits the escape of light from the tapered portion 54 of optical fiber 50. Note that only the sides of the tapered portion 54 are coated with opaque material 58 and the optical fiber tip 56 of optical fiber 50 is not covered by opaque material 58. The end face or tip 56 of optical fiber 50 is then chemically activated, herein effectuated using standard silanization methods. Chemically activating tip 56 serves to improve the attachment between tip 56 and the optically active material 60 to be subsequently chemically attached to the optical fiber tip 56.

Using standard methods, a polymer solution is prepared in anticipation of chemically attaching onto the optical fiber tip 56. The composition of this polymer solution varies in accordance with the desired application of the micro-light source. The optically active material includes any material which is in any manner responsive to excitation with light. For example, the material may fluoresce in a particular manner under a specified set of conditions and fluoresce differently under different conditions. After the solution is prepared, it is chemically attached to optical fiber tip 56 using known methods of photopolymerization. More specifically, the optical fiber tip 56 is placed near the polymer solution and laser light is coupled into the non-tapered end (not shown) of optical fiber 50 and transmitted to the optical fiber tip 56 to photo-initiate polymerization onto the silanized surface.

It should be noted that while photopolymerization is specified in this particular embodiment, there are several variations which are possible. The fabrication process photo-chemically attaches the optically active material to the optical fiber tip. Any method of photo-chemically attaching the optically active material to fiber optic tip 56 would suffice. Furthermore, the optically active material is dependent upon the desired application of the micro-light source. Some sensor applications may call for a reactive material that may include a fluorescent dye. Other application such as using the microlight source strictly as a non-reactive light source may, for example, require a more durable. non-reactive material.

The result of this photopolymerization process is depicted in FIG. 4. In FIG. 4, optical fiber 50 includes a non-tapered portion 52, tapered portion 54 coated with an opaque material 58, an end face or tip 56 to which is photopolymerized a cone of polymer material defined as the optical fiber probe 60. It should be noted that the photopolymerization reaction rate depends on the concentrations of the reactants, the reaction temperature, and the light intensity emitted from the fiber tip 56. More specifically, the thickness of the probe 60 prepared by photopolymerization can be controlled to any size in accordance with the reaction time. Thus, the thickness of the probe 60 is controlled by the reaction time used to photopolymerize the optically active material onto the fiber optic tip 56. Using these methods on a non-tapered (i.e., one not pulled to micro size) optical fiber enables 11he designer to determine the relationship between the thickness of the probe 60 and the polymerization reaction time under specific reaction conditions. This relationship further serves as a guideline for optimization of reaction time and intensity of the light employed in the polymerization process in order to determine the size of the probe 60.

It should be noted that the apparatus depicted in FIG. 1 is particularly useful for application as a scanning microscope. In this application, probe 60 of FIG. 4 may be continuously positioned over sample 24 through manipulation of translation stage 20. The apparatus functions as a scanning microscope with an extremely small light source 22 as defined by probe 60 of FIG. 4. Furthermore, by imparting chemically reactive properties into probe 60 so that probe 60 reacts with sample 24 when it contacts sample 24, a chemical scanning microscope may be effectuated in accordance with translational stage 20 continuously scanning sample 24. The chemically sensitive probe 60 enables detection not only of morphology or topology of the sample 24, but also the chemical nature of the sample. Probe 60 properties will vary in accordance with the sample and tip interaction.

Specific Example I

Chemicals. All of the chemical reagents used were purchased from Aldrich Chemical Co., except for the fiber surface silanization reagents [γ-(methacryloxy) propyl] trimethoxysilane] and (aminopropyl) triethoxysilane, obtained from Sigma. All chemicals were used without further purification.

Fiber Tip Fabrication. The apparatus used for fiber tip fabrication consists of a P87 Micropipette Puller (Sutter Instrument Co.) and a 25 watts $CO_2$ infrared laser (Synrad Co.). Multi-mode all-silica fibers (General Fiber Inc.) had core diameters ranging from 80 μm to 200 μm (General Fiber Inc.). Single mode fibers (Newport Research Corp. and 3M Co.) had core diameters of a few microns and cladding diameters around 1001 μm. All fibers were terminated at a length of 1 to 2 meters. The jacket was removed from the fiber where the fiber tip was to be formed. The fiber tip was produced by drawing an optical fiber in the puller while heating it with the $CO_2$ infrared laser. By using appropriate program parameters and laser power, optical fibers were tapered to 0.1 to 1 μm tips, hereafter referred to as pulled tips. A high vacuum chamber was employed for coating these pulled fiber tips. Only the optical fiber sides were coated with aluminum, leaving the end face as a transmissive aperture. To transform it into a light source, a laser beam was coupled to the opposite end of the pulled fiber tip.

Surface Activation by Silanization. Two different kinds of fiber surface silanization were used in the experiments. The first was with [γ-(methacryloxy)propyl]trimethoxysilane, and the second was with (aminopropyl) triethoxysilane. Both were successful. The former was preferred because it is simpler than the second.

Preparation of Acryloylfluorescein. Before used for photopolymerization, fluoresceinamine was converted into its amide derivative, acryloylfluorescein. The derivative was formed after reaction of 2:1 to 3:1 stoichiometric quantities of acryloyl chloride with fluoresceinamine in dry acetone, which was obtained by drying HPLC grade acetone in silica gel. The mixture was stirred for about one hour until most of the product precipitated. The product was collected by filtration, then washed by both acetone and by $CH_2Cl_2$ a few times. It was dried in air by evaporation, and stored in the dark.

Polymer Solution Preparation. The solution for polymerization on the fiber surface was a mixture which consisted of three solutions. The methods of preparation of these solutions have been described previously (See, Hicks, et al. Anal. Chem., 1966, 38,726-30.; Munkholm, et al., Anal Chem., 1986, 58, 1426-30.; Rempp, Polymer Synthesis, 2nd, Rev. Ed., Heidelberg New York, Huthig & Wepf, 1991, p. 419-459). Modifications made for this work will be briefly discussed. Acryloylfluorescein, prepared as described above, was dissolved in ethanol, with concentrations around 15 mM. This replaced solution 3 in Munkholm et al. Solutions 1 and 2 were pH=6.5 buffer solutions of acrylamide and N,N-methylenebis (acrylamide), respectively. They were prepared according to the procedures of Hicks et al. The monomer solution, referred to as solution 4 hereafter, was formed by combining 10 ml of solution 1, 40 ml of solution 2, and 2 ml of solution 3. Solution 4 can be stored in a refrigerator for about one month without evident polymerization.

Thermal and Photopolymerizations. The reactor used for both polymerizations was a small glass bottle with three holes in its cover, through which the fiber tip was inserted into the monomer solution, nitrogen was introduced through a glass tube and a small glass rod was introduced to test the gelation of the monomer solution. An oil bath heater was used to control the reaction temperature between 50° and 80° C.

For most submicron sensor development, photo-initiated polymerization was used while thermal initiation has also been tried. One difference between them was that it was necessary to add a catalyst to solution 4 for thermal polymerization, while light was employed for initiation in the photopolymerization. The catalyst was riboflavin or persulfate of either potassium or ammonium. It should be noted that the thermal reaction could not occur without both heating (to about 70° C.) and catalyst.

The disadvantages of the thermal polymerization were first, there was limited control over where the polymer grew, hence, polymers were formed anywhere along the portion of the tip immersed in the solution; second, once the reaction was initiated, all the solution inside the whole reactor polymerized quickly, thus miniaturization was not readily realized; third, it was relatively difficult to optimize the reaction conditions for the thermal polymerization.

For photopolymerization, light initiation and heating were combined. The fiber tips were first silanized for about one hour and then dried in air for another hour. Before being placed in solution 4 for polymerization, fiber tips were first sensitized by soaking in a benzophenone/cyclohexane solution for about 15 minutes. They were then put into solution 4 for photopolymerization. Solution 4 was bubbled with nitrogen for about 20 minutes before laser light was directed into the fiber tip and the nitrogen atmosphere was maintained during the reaction. Laser light 442 nm for a He/Cd laser or 488 nm from an Ar ion laser was coupled into the fiber and transmitted to the tip where photopolymerization was initiated directly on the silanized surface.

Some heating was usually needed for the reaction, and ten to thirty minutes of polymerization was necessary in order to get acceptable sensors, which enabled sufficient control over the thickness of the polymers on the sensor tips. The polymerization reaction rate depended on the concentrations of reactants, the reaction temperature, and the light intensity emitted from the fiber tip. The thickness of the sensor prepared by photopolymerization was close to the size of its diameter. The thickness of the polymer on the fiber tip was controlled by the reactor time allowed for the polymerization on the fiber tip. Because the sizes of the submicron fiber tips were very small and could not be resolved well by a conventional microscope, systematic thickness monitoring was performed by using unpulled single-mode fibers, and the relationship between the thickness of the polymer and the polymerization reaction time under specific reaction conditions was calculated. This relationship serves as a good guidelines with which to optimize the reaction time on submicron fiber tips in such a way that the thickness of the polymer was close to its diameter. The longer the sensor stays in the monomer solution, the thicker the sensor will be.

It should be noted that in the submicron sensor preparation process, the depth of the fiber tip inserted into all of the solutions was strictly controlled either for pretreatments or for polymerization. A three way XYZ stage with Z resolution of 0.07 μm was used to position the fiber tip, thus only the fiber tip end surface will come in contact with all of the solutions. For some cases, it was noticed that there was a liquid rise at the interface between the liquid surface and the fiber tip due to surface tension. Therefore, some monomer solution remained on the Al coated side surface. This, however, did not affect the operation of this sensor since internal illumination was used and no light was emitted from the sides of the probes.

A 0.3 W 488 nm Argon ion laser beam was used for excitation of the polymer. The spectra were taken from 490 nm to 650 nm while the sensor was immersed inside a pH=7 buffer solution. The data for the pH response of the sensor tip were collected at 540 nm by using a combination of a dichroic mirror and a band-pass filter. Using the apparatus shown in FIG. 1, intensities of the fluorescence of the polymer at the submicron sensor tip under different pH environments were recorded by a photon counting system (EG&G photon counter Model 1109 and Discriminator Control Unit Model 1121) with a Hamamatsu R1529 photomultiplier tube controlled by an IBM PC computer.

Response Time of Submicron pH Sensor. Response times of the submicron sensors were determined by the microscope-based sensor apparatus shown in FIG. 1. Ten milliseconds was used as the data acquisition time in order to get time resolved data. The submicron pH sensor was immersed inside a 10 ml glass container with distilled water as the test sample. The sensor was positioned towards the microscope objective and light collection was optimized. While data acquisition occurred, a tiny drop of 0.1 m HCl or NaOH was added to the distilled water in the glass container. A curve of the signal changing from one level to another is recorded over time, giving an upper limit for the response time of the submicron pH sensor. Note that no stirring took place and thus, most likely, this "response time" was determined by both the diffusion to the sensor and that inside the sensor.

Specific Example II

An apparatus utilizing the submicron fiber optic sensor (See Example I) was implemented to measure the pH of a substance. Light signal was collected through the objective lens of a microscope to increase the, collection efficiency by one or more orders of magnitude compared to back collection (through the same fiber) which is commonly used in NSOM. An Olympus inverted frame fluorescence microscope was connected with either an optical multichannel analyzer (OMA) or a photomultiplier tube (PMT). A 488 nm $AR^+$ or a 442 nm He/Cd laser beam was used for excitation of the dye polymer.

After pulling, the multi-mode and single-mode fiber's end structure tapered uniformly from the original fiber to a submicrometer tip with a flat end-surface perpendicular to the fiber axis. The sides were coated with aluminum, and the flat end of the tip was left bare forming tiny aperture. When a 30 mw 442 nm laser beam was coupled into the aluminum coated fiber tip, a very bright spot at the tip could be seen under the microscope. The probe delivered light very efficiently to the aperture as all the radiation remained bound to the core until a few micrometers from the tip. The signal emerging from a randomly chosen 0.2 μm fiber tip was $10^{12}$ photons per second as measured by using neutral density filters. Scanning electron microscopy showed that the sizes of the fiber tips were from 0.1 to 1 μm, with most around 0.51 μm.

The dependence of the fluorescence intensity on pH was opposite for these two excitations. For 442 nm excitation, higher pH decreased the fluorescence intensity whereas for 488 nm excitation, higher pH increased the fluorescence intensity. This is a consequence of the isosbestic point in the absorption spectra.

Micro pH fiber sensors were tested with nine different buffer solutions from pH =4 to pH=9. Measurements were cycled several times from pH=4 to 9. For each pH buffer solution, a fluorescence spectrum of the sensor was recorded by the OMA system. The typical exposure time for determining the fluorescence spectrum was 0.5 to 10s for submicrometer sensors. The use of the OMA system greatly enhanced the efficiency and precision of the experimental results. Moreover, since very short sensor excitation times were used, no evidence of photobleaching was observed after repeated experiments over a long time period. Thus, the lifetime of the sensor has been prolonged.

The ratio of the intensities at two different wavelengths was utilized to quantify pH. The ratios at 540/490 nm and 540/610 nm were large enough for a sensor to measure pH sensitivity in the physiological range. Only certain wavelength combinations give accurate calibration. Different sensors have slightly different behaviors for their intensity ratios due to the sensor geometry or dye distribution (aggregation).

The feasibility of the miniaturized optical fiber sensor and the internal calibration technique was tested with some aqueous solutions and several biological samples. The biological samples tested were blood cells, frog cells and various aged rat embryos during their early life (from 8 days to 12 days). For example, consider the pH measurement of a mid-gestation rat embryo. The optical fiber sensor is inserted into the extraembryonic cavity of the embryo. Thus, only a single embryo was required to measure pH, while previously over one thousand embryos had to be "homogenized" for a single measurement (15). The single embryo pH measurements (e.g. pH 7.50±0.05 for day 10 rat embryo) fully agree with those from "homogenized" samples (e.g. pH=7.46±0.06 for day 10 rat embryos). Furthermore, the measurements carried out by our sensors are nondestructive single-cell operations.

The accuracy of the optical fiber sensors was compared to that of a macroscopic standard high-precision pH meter (Omega), using four aqueous solutions in the physiological pH range. The results from the sensor are close to those obtained from the commercial pH meter and demonstrate the effectiveness of the internal calibration method in quantifying pH.

Aiming at enhancing the working ability of the miniaturized optical fiber sensors, several internal calibration methods were used to quantify pH that appeared simpler and apparently better than previously reported approaches. The method was based on the fluorescence intensity ratio obtained from different wavelengths of the same emission spectrum for a single dye. It was highly effective for small-sized sensors, especially when dye species absorption differences are also used. Because various ratios could be obtained by selecting the intensities at different wavelengths of the same spectrum, this approach provided more than a double check for a single experiment. The change in the ratio per pH unit was increased up to ten times if two different excitation sources were used. Thus it greatly enhanced the sensitivity and accuracy of our measurements and greatly improved the working ability of these miniaturized sensors in biological samples.

II. MULTI-DYE PROBE

A multi-dye matrix may also be photochemically attached to an optical fiber tip to form a multi-functional micro-light source/sensor having an extremely small size. Such a micro-light source/sensor admits multi-wavelength photons or produces excitons of different energy levels. There are two methods for polymerizing multi-dye material onto the fiber tip 56 of optical fiber 50 shown in FIGS. 2–4. A first method is to use two or more dye molecules in polymerizable functional groups for photopolymerization, thus, cross-linking a copolymer dye in the form of probe 60 onto optical fiber tip 56, the dyes being covalently bonded to optical fiber tip 56. In a second method, one of the dyes bonds covalently to optical fiber tip 56, while the other dye is trapped inside the polymer. A specific example of a trapped polymer is provided below.

Specific Example III

In this example, multi-dye material is attached to fiber optic tip 56 to form probe 60. In the double-dye system described herein, rhodamine B (Rh B) and acryloylfluroescien (FLAC) comprise the two dyes to be attached to optical fiber tip 56. After photopolymerization, FLAC has been covalently bonded onto optical fiber tip 56 to form an acrylamide copolymer with the cross linkers, while Rh B is trapped inside the polymer.

In experimentation, different combinations of Rh B in FLAC monomer solutions were prepared, and the mixture was photopolymerized onto an activated fiber tip 56. In viewing the spectra of polymer probes prepared with varying concentrations of Rh B in the monomer solution, a significant Rh B emission appears in the spectrum despite the limited concentration in the solution. The higher the concentration of Rh B, the larger the red shift in the spectrum, implying that the Rh B emission becomes more dominant in the spectra. An eventual consumption of the FLAC spectral peak by the Rh B indicates a clear energy transfer from FLAC to Rh B. Other dye materials, such as flourescent latex microspheres and dextrans may also be used to prepare multi-dye materials for photo-chemical attachment to optical fiber probes. These probes have specific chemical sensitivities based on the properties of the dye matrix. For example, by using RHOD-II and SNARF, in either flourecence dye form or dextran form, the probes have calcium and pH sensitivies, respectively. The retaining ability of these flourescent latex microspheres and dextrans inside the copolymer is excellent.

A multi-dye configuration of probe 60 provides for a multi-function micro-sensor or micro-light source. For example, each dye may be chemically activated by a different chemical compound, which enables the sensing of more than one chemical property. A number of additional benefits of a multi-dye probe includes enhanced sensitivity, selectivity, and stability. Multi-dye probes may be used for internal calibration or for multi-species detection and, depending upon the properties of the multi-dye material, single molecular detection is possible because of a single molecular active center.

III. TAPERED FIBER SENSOR

Figures 5A, 5B, 6, 7:
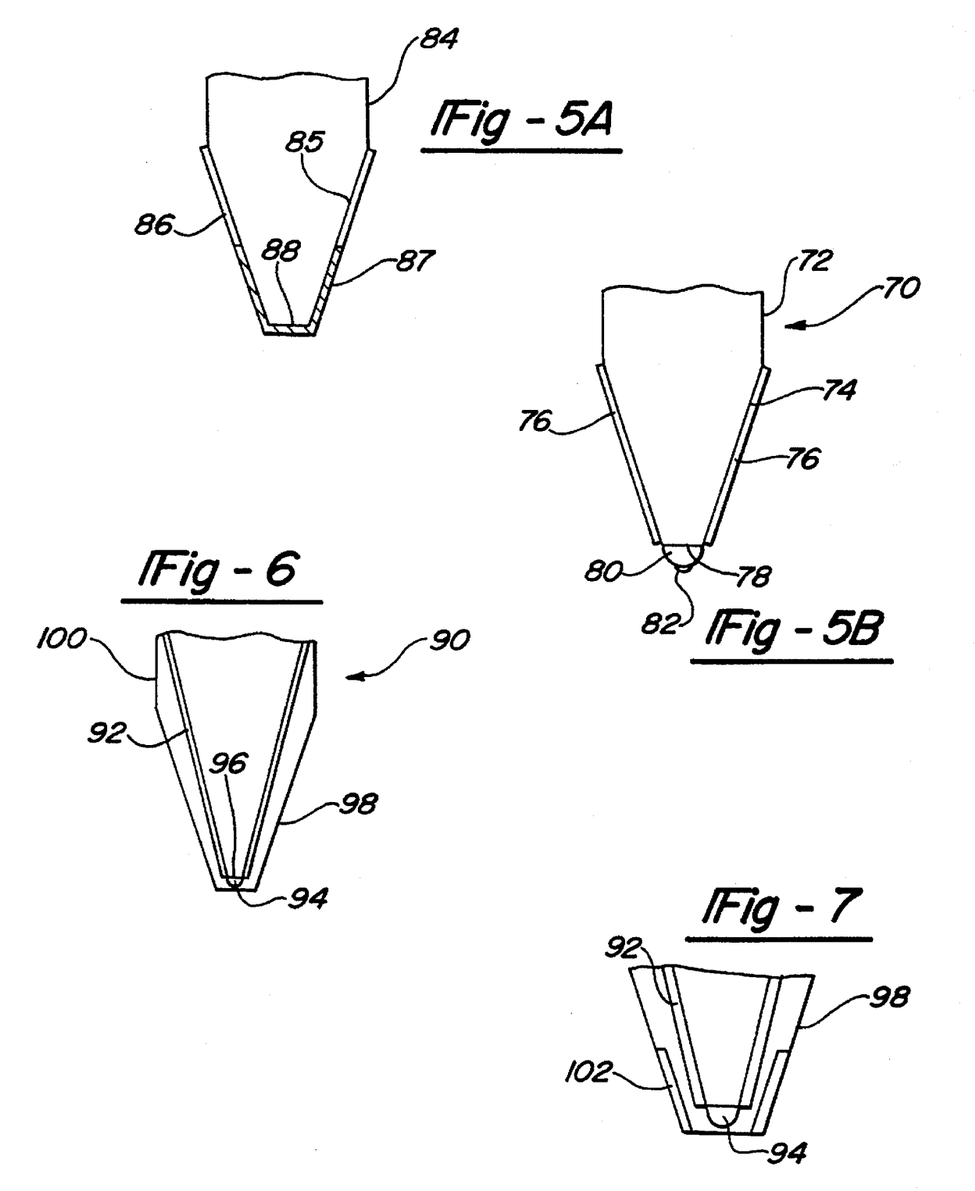
FIGS. 5a–b depict two alternative arrangements for the attachment of dye to the tapered portion of an optical fiber.
FIG. 6 depicts a micro-light sensor according to this invention inserted into the shank portion of a micro pipette to provide protection and sampling capabilities.
FIG. 7 depicts the apparatus of FIG. 6 with chemically reactive material attached to the inner surface of the micro pipette shank.

FIG. 5a depicts an alternative embodiment in the form of a tapered optical fiber having material attached thereto. In this embodiment, optical fiber 84 includes a tapered portion 85 partially covered by an opaque material 86. Contrary to the configurations described above, opaque material 86 does not extend to the tip 88 of optical fiber 84. Rather, opaque material 86 is recessed from optical fiber tip 88 and a chemically active material 87 is then photopolymerized onto optical fiber tip 88 and partially onto the tapered portion 85 of optical fiber 84. Extending the optically active material 87 up the tapered portion 85 of optical fiber 84 provides a large surface area for sensing the same lateral resolution, offering a surface sensing area significantly greater than may be provided by photo chemically attaching optically active material onto merely the tip of an optical fiber. The increased surface area offers improved light coupling efficiency for back collection due to increased numerical aperture as well as higher detection sensitivity.

IV. MULTI-STEP MINIATURIZATION

FIG. 5b shows an optical fiber 72 to which is attached dye material via a multi-step miniaturization process. The optical fiber 70 includes many of the elements depicted in FIG. 4 including a nontapered section 72, a tapered section. 74, and an opaque material 76. Attached to the tip 78 of optical fiber 70 is a first dye material 80. This dye material may be attached to the optical fiber tip 78 using photopolymerization processes as described with respect to FIGS. 2–4. Dye material 80 may optionally be a multi-dye material as described above. Attached to dye material 80 is an additional layer of dye material 82 which may be the same or different as dye material 80.

As described above with respect to Specific Example III, Rh B may be trapped or doped inside the FLAC polymer which is covalently grown on a silanized fiber tip surface. An efficient energy transfer has been observed from FLAC to Rh B; however, because the Rh B is homogeneously distributed within the polymer material, there is no effective size reduction for the probe. In a multi-step polymerization process as described herein, a significant size reduction may be realized by polymerizing a first dye material 80 to the fiber optic tip 78, then polymerizing a second dye material 82 to the first dye material 80. During the multi-step polymerization, a FLAG monomer solution may be used to perform the near-field photopolymerization. By controlling the reaction time, it is possible to know the amount of polymer grown on optical fiber tip 78. After a cone shaped polymer is formed on optical fiber tip 78, and the polymer has accumulated to a predetermined size, Rh B solution is added to the reactor. The polymerization process on fiber tip 78 continues, forming a polymer material comprised of Rh B represented as dye material 82 in FIG. 5. Such a multi-step polymerization process has many of the same advantages as the multi-dye configuration as described above in accordance with Specific Example III. It has the additional advantage that the light aperture has the dimensions of the length of intersection of first dye material 80 and second dye material 82, as compared to the length of fiber optic tip 78.

V. PROTECTION OF MICRO-SENSOR/LIGHT SOURCE

FIG. 6 generally depicts a protected micro-sensor or micro-light source 90 arrangement. An optical fiber tapered portion 92 has a probe 94 attached to optical fiber tip 96 using any of the methods as described above. The optical fiber tapered portion 92 and attached probe 94 is inserted into the shank portion 98 of a micro pipette 100. The micro pipette 100 is a pulled micro pipette and may be pulled using any one of a number of methods known in the art. Probe 94 may be a single dye material, multi-dye material, or multiple dye materials applied in a multi-step photopolymerization process as described above. The protected micro-sensor 90 depicted in FIG. 6 offers several advantages in addition to those advantages offered by an unprotected sensor. Micro pipette 100 offers protection to probe 94 and prolongs the life time of probe 94. In addition, micro pipette 100 may be used as a needle to puncture biological samples, offering further protection to the area in and surrounding probe 94. In addition, if micro pipette 100 is used as a needle to punch biological samples, fluid may be taken up into the shank portion 98 of micro pipette 100 in order to contact probe 94 so that chemical analysis may occur.

FIG. 7 depicts a partial cut-away section of protected micro-sensor 90 showing the shank portion 98 of the micro pipette into which is inserted an optical fiber tapered portion 92 to which is attached probe 94. The inner portion of shank 98 is coated with illuminescent material 102 deposited within the micro pipette shank 98. The placement of illuminescent material 102 offers several advantages in the miniaturization of chemical probes. The effective light source size may be made smaller than the physical size of the area to be filled with a doped polymer. The polymer may be used as an energy donor while the doped dye acts as an accepter. The polymer of the fiber optic probe 94 absorbs incident light from the optical fiber and converts the light to energy that is transferred to the acceptor dye. Because illuminescent material 102 is activated by light of a particular frequency, a second mode of operation exists in which material 102 absorbs light from either or both of probe 94 and fiber optic tip 96. Furthermore, such an arrangement may also function as a type of portable test tube in which illuminescent material 102 may react with fluid drawn up into shank 98, and the chemical reaction may be quantified based on a chemical reaction between the mixture and ,either or both of probe 94 and illuminescent material 102.

VI. MICRO-LIGHT SOURCE AS A LIGHT TRANSMITTER IN A MICRO PIPETTE

Figure 8:
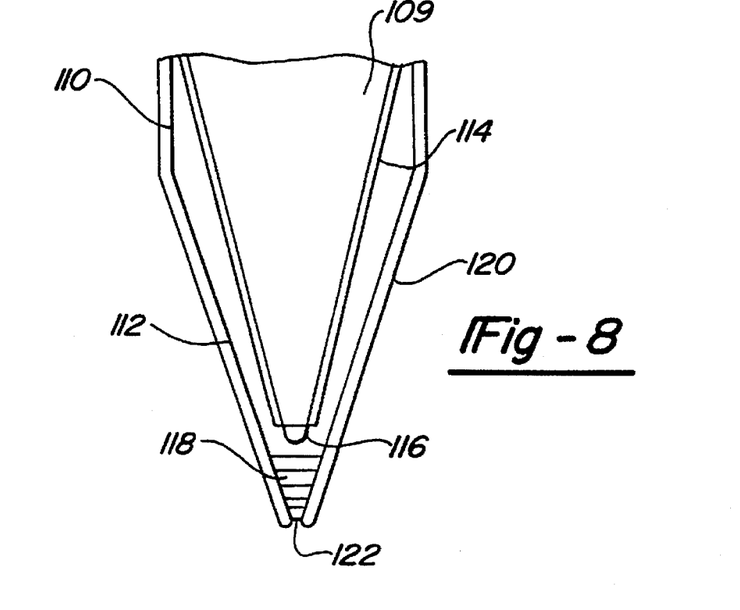
FIG. 8 depicts an optical fiber light source according to this invention inserted into a pulled micro pipette in which illuminescent material is located in proximity to the aperture of the micro pipette.

FIG. 8 depicts a micro pipette 110 having a shank portion 112 into which is inserted a tapered portion 114 of an optical fiber 109 to which is attached probe 116. Because the illuminescent material 102 is activated by light of a particular frequency, a second mode of operation exists in which material 102 absorbs light from either or both of probe 94 and fiber optic tip 96. At subwavelength aperture 122 of micro pipette 110 is an illuminescent material 118 to which probe 116 is placed in proximity thereto. In this configuration, the tapered portion 114 and the attached light probe 116 of an optical fiber function as a light source to illuminate dye 118 having less dispersion than light directed into micro pipette 110. Such an arrangement is particularly advantageous because the intensity of light exponentially decreases in accordance with the radius of the passage through which it travels. The point source of light provided by probe 116 transforms the micro pipette 110 from a passive aperture to an active emitter. Micro pipette 110 is further coated by an opaque metal coating 120 which prevents the passage of light between the micro pipette 110 and the external environment. In this manner, all light must exit through subwavelength aperture 122 of micro pipette 110 where dye material 118 is placed. The subwavelength aperture 122, of metal coated micro-pipette 110 is filled with a molecular crystal or doped polymer. Incoming photons propagate in the direction of dye material 118 and are absorbed by the material. The absorbed photons generate excitons that propagate through aperture 122. Exciton transport is, thus, primarily controlled by the geometry of the crystalline material 118 which is controlled by the geometry of the tip of shank 112 particularly near subwavelength aperture 122. Thus, the efficiency of the light transfer decreases geometrically rather than exponentially in accordance with aperture size.

Specific Example IV

In this example, crystals of molecular perylene are used to demonstrate the idea of active light and exciton sources. The crystals typically have electronic and radiative properties which are fairly easily measured and have been extensively characterized. Using any one of a number of known methods for preparing a perylene crystal, a perylene crystal tip is formed having a micro crystal in the shank region 112 and a nano-crystal in the area of micro pipette aperture 122. Any number of materials may be used for illuminescent material 118 provided they have the appropriate luminescent properties.

Several advantages of this method of light transport to the tip of a micro pipette exists. First, there is a very high efficiency of light transmission to the micro pipette tip as well as a significant intensity of light at the micro pipette due to the properties of the micro-light source. Second, there is a highly increased molecular excitation probability within the near field. Third, it transforms the micro pipette from a passive light transmitter to an active light transmitter, providing one additional way of possibly sampling and analyzing biological fluid simultaneously.

VIII. DUAL ELECTRICAL AND OPTICAL PROBE

Figure 9:
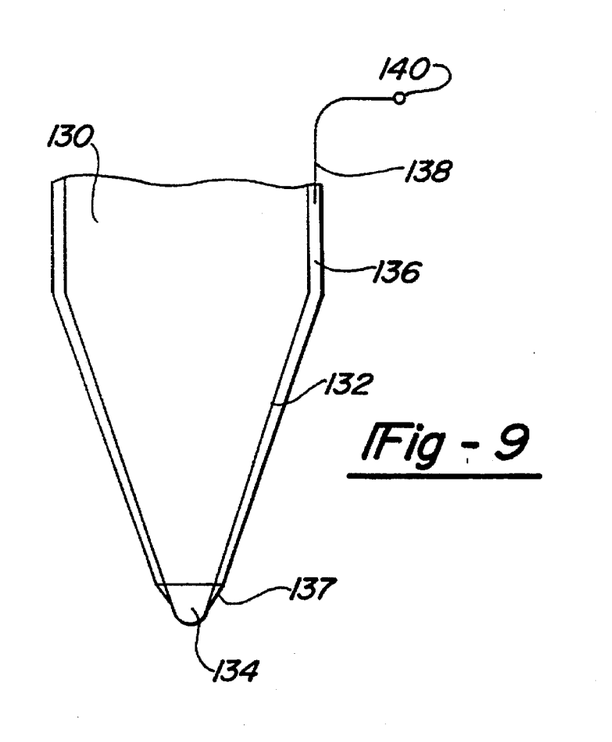
FIG. 9 depicts an optical fiber light source/sensor according to this invention having an electrode attached to the metal coating for performing electrical sensing.

FIG. 9 depicts an optical fiber 130 having a tapered portion 132 to which is attached probe 134. Optical fiber 130 is coated with a conductive opaque material 136. Probe 134 is partially coated with a conducting non-opaque material 137 which may be the conductive material 136 applied in a coating sufficiently thin to be non-opaque. The application of conductive non-opaque material 137 will generally occur after attachment of probe 134. Implanted in the metallic coating 136 is an electrode 138 having a terminal 140. Electrode 138 provides electrical communication to the area in proximity to probe 134. In this manner, the optical fiber sensor depicted in FIG. 9 may be used substantially simultaneously as a micro-light source or micro-light sensor and as a miniaturized electric probe. Voltage potential or current may be detected at probe 134 to produce an electrical output signal at terminal 140. A dual electric/optical probe may simultaneously monitor more than one signal and enables electrochemical analysis to occur via spectroscopic approaches. A dual probe may also function as both an optical sensor and an electrochemical sensor each of which may detect different species within a sample. Furthermore, by deposition or modification to the end surface of the electrical conductor, an ultra micro electrode having specific chemical and biological sensitivity may be produced. The deposited materials need only be optically transparent in order to perform both functions.

While the above description constitutes the preferred embodiments of the present invention, it will be appreciated that the invention is susceptible to modification, variation, and change without departing from the proper scope and fair meaning of the accompanying claims.

We claim:

1. An optical fiber light source comprising an optical fiber having one end of said fiber substantially uniformly tapered to define a tapered portion of said optical fiber, said tapered portion having an end face to further define an optical fiber tip, said tapered portion also having sides coated with an opaque material to prevent the escape of light from said tapered portion, and an optically active material photochemically attached to said optical fiber tip where said optically active material is responsive to excitation by light wherein the optically active material includes a first dye material photopolymerized onto said fiber optic tip and a second optically active dye material photopolymerized onto said first optically active dye material.

2. The apparatus of claim 1 wherein said optically active material comprises at least one illuminescent dye.

3. An optical fiber light source comprising an optical fiber having one end of said fiber substantially uniformly tapered to define a tapered portion of said optical fiber, said tapered portion having an end face to further define an optical fiber tip, said tapered portion also having sides coated with an opaque material to prevent the escape of light from said tapered portion, and an optically active material photochemically attached to said optical fiber tip where said optically active material is responsive to excitation by light, the tapered portion of said optical fiber being is inserted into a pulled micro pipette having a shank portion terminating in an aperture of said micro pipette, said optically active material located substantially near said aperture.

4. The apparatus as defined in claim 3 wherein said micro pipette provides protection for said fiber optic tip and optically activated material.

5. The apparatus as defined in claim 3 wherein a fluid may be drawn into the shank portion of said micro pipette so that chemical analysis may be performed.

6. The apparatus as defined in claim 3 wherein the shank of said micro pipette has inner walls coated with a chemically responsive material, said material being chemically responsive to a fluid drawn into the shank portion of said micro pipette, said material interacting with said fluid, enabling chemical analysis via said optically active material.

7. The apparatus as defined in claim 3 further comprising:
  an opaque material applied to the exterior of said micro pipette; and
  a luminescent material within the shank portion of said micro pipette and near said aperture of said micro pipette, said optically active material acting as a light source for said luminescent material through said optical fiber.

8. The apparatus as defined in claim 1 wherein said opaque material is a conductive material and said material partially coats a non-tapered portion of said optical fiber, said material having a thickness so as to be a non-opaque coating on said non-tapered portion, and an electrode having one end implanted in said optically active material for detecting an electro-chemical signal in proximity to said optically active material.

9. A fiber optic light source sensor wherein said sensor includes:
  an optical fiber including a first tapered terminal end and a tip as defined by an end face of the tapered optical fiber, said tip having a diameter less than 10 micrometers;
  an optically active material photopolymerized onto the tip of said tapered end, said optically active material including a dye whose optical response varies in accordance with the particular condition to be sensed:
  a light source coupled to a second non-tapered end of said optical fiber where said light source generates light of predetermined intensity and wavelength;
  a scanner for substantially continuously positioning said optically active material with respect to said sample said optically active material of said optical fiber in close proximity to a sample;
  an objective lens disposed in proximity to the optically active material of said optical fiber so that light emitted from said material is collected by said objective lens after interaction with the sample; and
  a means for analyzing said light emissions absorbed by said objective lens.

10. The apparatus as defined in claim 9 wherein said optically active material chemically interacts with said sample wherein light from said light source is emitted from said optically active material varies in intensity and wavelength in accordance with said chemical interaction.

11. The apparatus as defined in claim 9 wherein said optically active material operates as a light source for illumination of said sample.

12. The apparatus as defined in claim 9 wherein said scanner comprises a three way translational stage for positioning the optically active material in three orthoganal directions with respect to said sample.

13. A fiber optic light source sensor wherein said sensor includes:
  an optical fiber including a first tapered terminal end and a tip as defined by an end face of the tapered optical fiber, said tip having a diameter less than 10 micrometers;
  an optically active material photopolymerized onto the tip of said tapered end, said optically active material including a dye whose optical response varies in accordance with the particular condition to be sensed:
  a light source coupled to a second non-tapered end of said optical fiber where said light source generates light of predetermined intensity and wavelength;
  a three-way translational stage for positioning the optically active material of the optical fiber in close proximity to a sample to effectuate a light emission varying in intensity and wavelength in accordance with said chemical interaction between said sample and said optically active material;
  an objective lens disposed in proximity to the optically active material of said optical fiber so that light emitted from said material is collected by said objective lens after interaction with the sample; and
  a means for analyzing said light emissions absorbed by said objective lens.

14. An optical fiber light source comprising an optical fiber having one end of said fiber substantially uniformly tapered to define a tapered portion of said optical fiber, said tapered portion having an end face to further define an optical fiber tip, said tapered portion having sides partially coated with an opaque material, leaving an uncoated band of said optical fiber in proximity to said optical fiber tip, and an optically active material photo-chemically attached to said optical fiber tip and said uncoated tapered portion, said optically active material being responsive to excitation by light.

15. The apparatus as defined in claim 14 wherein said optically active material is chemically attached using a photo-chemical process whereby light is coupled into a nontapered end of said optical fiber to enable, fabrication of the optically active material in a predetermined size and shape.

16. The apparatus of claim 15 wherein said photopolymerization process may occur repeatedly in order to photopolymerize substantially different chemically active materials.

17. The apparatus of claim 15 wherein said photopolymerization process may occur repeatedly in order to photopolymerize said optically active material onto said fiber optic tip in progressive steps.

18. An optical fiber light source comprising:
  an optical fiber having one end of said fiber substantially uniformly tapered to define a tapered portion of said optical fiber, said tapered portion having an end face to further define an optical fiber tip, said tapered portion also having sides coated with an opaque material to prevent the escape of light from said tapered portion, and an optically active material photo-chemically attached to said optical fiber tip where said optically active material is responsive to excitation by light;
  a pulled micro pipette having a shank portion terminating in an aperture of said micro pipette, said optically active material located substantially near said aperture.

19. The apparatus as defined in claim 18 wherein said micro pipette provides protection for said fiber optic tip and optically activated material.

20. The apparatus as defined in claim 18 wherein a fluid may be drawn into the shank portion of said micro pipette so that chemical analysis may be performed.

21. The apparatus as defined in claim 18 wherein the shank of said micro pipette has inner walls coated with a chemically responsive material, said material being chemically responsive to a fluid drawn into the shank portion of said micro pipette, said material interacting with said fluid, enabling chemical analysis via said optically active material.

22. The apparatus as defined in claim 18 further comprising:

an opaque material applied to the exterior of said micro pipette; and a luminescent material within the shank portion of said micro pipette and near said aperture of said micro pipette, said optically active material acting as a light source for said luminescent material through said optical fiber.

23. An optical fiber light source comprising:

an optical fiber having one end of said fiber substantially uniformly tapered to define a tapered portion of said optical fiber, said tapered portion having an end face to further define an optical fiber tip, said tapered portion also having sides coated with an opaque material to prevent the escape of light from said tapered portion, and an optically active material photo-chemically attached to said optical fiber tip where said optically active material is responsive to excitation by light;

said opaque material is a conductive material and said material partially coats a non-tapered portion of said optical fiber, said material having a thickness so as to be a non-opaque coating on said non-tapered portion, and an electrode having one end implanted in said optically active material for detecting an electrochemical signal in proximity to said optically active material.

* * * * *

UNITED STATES PATENT AND TRADEMARK OFFICE
CERTIFICATE OF CORRECTION

PATENT NO. : 5,627,922
DATED : May 6, 1997
INVENTOR(S) : Raoul Kopelman, Weihong Tan, and Zhong-You Shi It is certified that error appears in the above-indentified patent and that said Letters Patent is hereby corrected as shown below:

ON THE TITLE PAGE, under the heading Related U.S. Application Data, "PCT/US93/08250" should be --PCT/US93/08350--.

Column 4, line 46, "11he" should be --the--.

Column 4, line 53, insert --as-- before "depicted".

Column 5, line 16, "1001$\mu$" should be --100$\mu$--.

Column 6, line 14, delete --.-- after "section". --(to about 70°C)--.

Column 6, line 46, "reactor" should be --reaction--.

Column 10, line 5, delete --.-- after "section".

Column 10, line 25, "FLAG" should be --FLAC--.

Column 11, line 15, delete "," after --and--.

UNITED STATES PATENT AND TRADEMARK OFFICE
CERTIFICATE OF CORRECTION

PATENT NO. : 5,627,922
DATED : May 6, 1997
INVENTOR(S) : Raoul Kopelman, Weihong Tan, and Zhong-You Shi It is certified that error appears in the above-indentified patent and that said Letters Patent is hereby corrected as shown below:

Column 12, line 13, "conducting" should be --conductive--.

Signed and Sealed this

Twenty-first Day of October 1997

Attest:

BRUCE LEHMAN

Attesting Officer     Commissioner of Patents and Trademarks